United States Patent
Chang et al.

(10) Patent No.: US 8,384,689 B2
(45) Date of Patent: Feb. 26, 2013

(54) SWITCHED-CAPACITOR TRACKING APPARATUS OF TOUCH PANEL AND OPERATING METHOD THEREOF

(75) Inventors: Yaw-Guang Chang, Tainan County (TW); Chin-Feng Hsu, Tainan County (TW)

(73) Assignee: Himax Technologies Limited, Tainan (TW)

( * ) Notice: Subject to any disclaimer, the term of this patent is extended or adjusted under 35 U.S.C. 154(b) by 693 days.

(21) Appl. No.: 12/635,011

(22) Filed: Dec. 10, 2009

(65) Prior Publication Data

US 2010/0328252 A1   Dec. 30, 2010

Related U.S. Application Data

(60) Provisional application No. 61/220,201, filed on Jun. 25, 2009.

(51) Int. Cl.
*G06F 3/045* (2006.01)
*G06F 3/044* (2006.01)
*G08C 21/00* (2006.01)

(52) U.S. Cl. ..................... 345/174; 178/18.06
(58) Field of Classification Search ............ None
See application file for complete search history.

(56) References Cited

U.S. PATENT DOCUMENTS

| 2005/0104867 A1* | 5/2005 | Westerman et al. ......... 345/173 |
| 2009/0153152 A1 | 6/2009 | Maharyta et al. | |

FOREIGN PATENT DOCUMENTS

| CN | 101384981 | 3/2009 |
| CN | 101556297 | 10/2009 |
| TW | 200905538 | 2/2009 |
| WO | 2007032305 | 3/2007 |
| WO | WO 2007032305 A1 * | 3/2007 |

OTHER PUBLICATIONS

"First Office Action of China counterpart application" issued on Nov. 23, 2012, p1-p5.
"Office Action of Taiwan counterpart application" issued on Nov. 15, 2012, p1-p4.

* cited by examiner

*Primary Examiner* — Joseph Haley
*Assistant Examiner* — Nicholas Lee
(74) *Attorney, Agent, or Firm* — J.C. Patents

(57) ABSTRACT

A switched-capacitor tracking apparatus including a variable capacitor, an auxiliary capacitor, and a plurality of switches, and an operating method thereof are provided. In a charge period, a first reference voltage charges a panel capacitor, and a second reference voltage charges the variable capacitor. In a detection period, a control circuit detects a parallel connected voltage of the panel capacitor and the variable capacitor. The control circuit compares a third reference voltage and the parallel connected voltage. According to a comparison result, the control circuit dynamically determines whether to parallel connect the auxiliary capacitor to the variable capacitor. If all the comparison results accumulated in a statistics period are a first logic value, then the control circuit increases a capacitance of the variable capacitor. Moreover, if all the comparison results are a second logic value in the statistics period, then the control circuit decreases the capacitance of the variable capacitor.

22 Claims, 11 Drawing Sheets

SWITCHED-CAPACITOR TRACKING APPARATUS OF TOUCH PANEL AND OPERATING METHOD THEREOF

CROSS-REFERENCE TO RELATED APPLICATION

This application claims the priority benefit of U.S.A. provisional application Ser. No. 61/220,201, filed on Jun. 25, 2009. The entirety of the above-mentioned patent application is hereby incorporated by reference herein and made a part of specification.

BACKGROUND OF THE INVENTION

1. Field of the Invention

The invention is generally related to a capacitive readout circuit of a touch panel, and more particularly, to a switched-capacitor tracking apparatus of the touch panel.

2. Description of Related Art

In many electronic products, a capacitor characteristic (i.e. capacitance) of a target component is read out frequently. For instance, variations in the capacitances of the currently popular touch panels are detected by the readout circuit. Generally speaking, the touch panel can be classified into a resistive touch panel, an optical touch panel, and a capacitive touch panel, etc. Compared with a keyboard and a mouse, the touch panel is a simpler, more direct input/output interface. Therefore, the touch panel is usually applied as a man-machine interface between a man and an electronic device. The capacitive touch panels are operated by approaching or touching the touch panels with a finger or a conductive material to change the capacitances of the touch panels. By reading the circuitry to detect the capacitance variations of the capacitive touch panels, the touch locations of the conductive body or the finger on the touch panel can be detected.

FIG. 1 is a schematic block diagram illustrating a function of a conventional touch panel. A touch panel 14 includes a plurality of pixel capacitors. FIG. 1 illustrates a panel capacitor (i.e. a target capacitor 16) as a representative example. The data from the target capacitor 16 is transmitted to the analog to digital converter 18 (ADC 18). Consequently, the ADC 18 can convert a capacitance of the target capacitor 16 to a digital value. The ADC 18 illustrated in FIG. 1 consumes great effort for changing whole capacitance of the target capacitor 16 to the digital value. If the capacitance range of the target capacitor 16 is from 0 pF to 50 pF, then an output of the ADC 18 is 16 bits. When the capacitance of the target capacitor 16 varies from 25 pF to 25.1 pF (wherein 25 pF is DC component of the capacitance, 0.1 pF is AC component of the capacitance), a digital code outputted by the ADC 18 changes from 32768 (i.e. $2^{16} \times 25 \div 50$) to 32899 (i.e. $2^{16} \times 25.1 \div 50$). The ADC 18 has always needed to converts the DC component of the capacitance of the target capacitor 16.

SUMMARY OF THE INVENTION

Aspects of the invention provide a switched-capacitor tracking apparatus of a touch panel and an operating method thereof, in order to automatically track a capacitance variation of a panel capacitor and to enhance a differentiation capability for sensing capacitor variation.

Embodiments of the invention provide a switched-capacitor tracking apparatus of a touch panel configured to track the capacitance variation of the panel capacitor. The switched capacitor tracking apparatus includes a variable capacitor, an auxiliary capacitor, a first clock phase generator, a first switch, a second switch, a third switch, a fourth switch, a fifth switch, a sixth switch, and a control circuit. A first terminal of the first switch is coupled to a first reference voltage, and a second terminal of the first switch is coupled to the panel capacitor. A first terminal of the second switch is coupled to the panel capacitor. A first terminal of the third switch is coupled to a second reference voltage, and a second terminal of the third switch is coupled to the variable capacitor. A first terminal of the fourth switch is coupled to the variable capacitor, and a second terminal of the fourth switch is coupled to the second terminal of the second switch. Wherein, the first switch and the third switch are turned on and the second switch and the fourth switch are turned off in a charge period of a first clock signal, and the first switch and the third switch are turned off and the second switch and the fourth switch are turned on in a detection period of the first clock signal. A first terminal of the fifth switch is coupled to a second reference voltage, and a second terminal of the fifth switch is coupled to the auxiliary capacitor. A first terminal of the sixth switch is coupled to the auxiliary capacitor, and a second terminal of the sixth switch is coupled to the second terminal of the second switch. The control circuit is coupled to the second terminal of the second switch. According to a first capacitor step value, the control circuit sets a capacitance of the variable capacitor, and the control circuit compares a third reference voltage with a voltage at the second terminal of the second switch. According to a comparison result, the control circuit controls the fifth switch and the sixth switch. In a statistics period, the control circuit accumulates a plurality of the aforementioned comparison results. If all the comparison results are a first logic value in the statistics period, then the control circuit increases the first capacitor step value. If all the comparison results are a second logic value in the statistics period, then the control circuit decreases the first capacitor step value.

Aspects of the invention provide an operating method of the above-described switched-capacitor tracking apparatus. The operating method includes defining a period of a plurality of clock cycles in the first clock signal as a first statistics period; setting the capacitance of the variable capacitor in the first statistics period according to a first capacitor step value; turning on the first switch and the third switch and turning off the second switch and the fourth switch in a charge period of the first clock signal; turning off the first switch and the third switch and turning on the second switch and the fourth switch in a detection period of the first clock signal; comparing the third reference voltage and the voltage at the second terminal of the second switch, so as to obtain the comparison result; controlling the fifth switch and the sixth switch according to the comparison result; accumulating a plurality of comparison results in the first statistics period; increasing the first capacitor step value if all the comparison results in the first statistics period are the first logic value; decreasing the first capacitor step value if all the comparison results in the first statistics period are the second logic value.

In summary, whether to parallel connect the auxiliary capacitor to the variable capacitor is dynamically determined according to the comparison result from comparing the third reference voltage and the voltage at the second terminal of the second switch. Additionally, by accumulating a plurality of the aforementioned comparison results in the statistics period, the capacitance variation between the variable capacitor and the panel capacitor can be known. Suppose the capacitance of the panel capacitor is Cp, the capacitance of the variable capacitor is Ca, and the capacitance of the auxiliary capacitor is Cb. When Cp>(Ca+Cb) (or Cp<Ca), the first capacitor step value is increased (or decreased) until Ca<Cp< (Ca+Cb). Therefore, the switched-capacitor tracking apparatus of embodiments of the invention can automatically track the capacitance variation of the panel capacitor. Using the touch panel as an exemplary application, the capacitance of the panel capacitor has an intrinsic component and a variation component (i.e. the capacitance variation when the touch panel is touched). After adjusting the variable capacitor close to the intrinsic component of the panel capacitor, the switched-capacitor tracking apparatus 100 of embodiments of the invention can detect only the variation component, thereby enhancing the differentiation capability for sensing capacitor variation (i.e. increase in resolution).

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
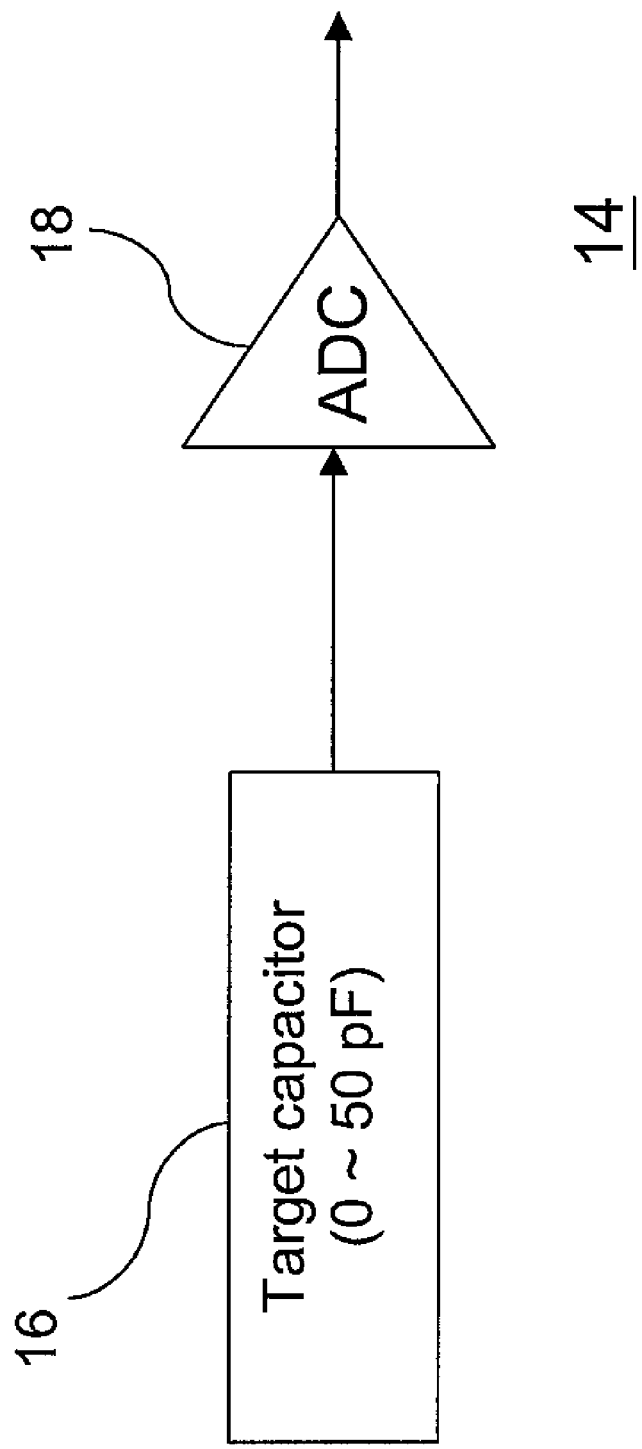
FIG. 1 is a schematic block diagram illustrating a function of a conventional touch panel.
Figure 2:
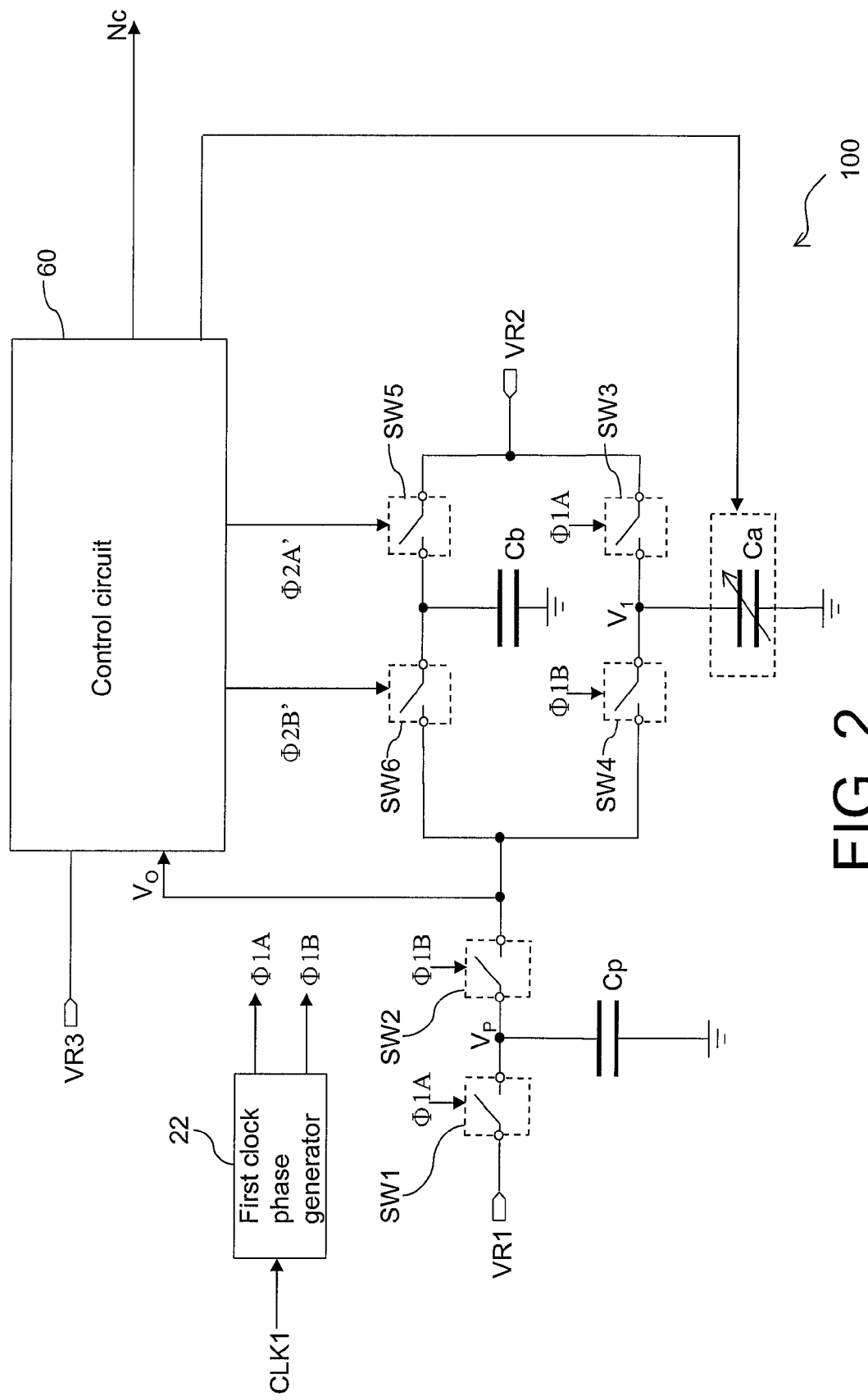
FIG. 2 is a circuit block diagram of a switched-capacitor tracking apparatus of a touch panel in accordance with an embodiment of the invention.

FIG. 2 is a circuit block diagram of a switched-capacitor tracking apparatus of a touch panel in accordance with an embodiment of the invention. Referring to FIG. 2, a switched-capacitor tracking apparatus 100 can track a capacitance variation of a panel capacitor Cp of the touch panel. Using an capacitive touch panel as an example, the panel capacitor Cp can be a pixel capacitor within the touch panel. When an user touches the touch panel, the panel capacitor Cp changes a capacitance due to the contact. The switched-capacitor tracking apparatus 100 can automatically track the capacitance variation of the panel capacitor Cp.

The switched capacitor tracking apparatus 100 includes a variable capacitor Ca, an auxiliary capacitor Cb, a first switch SW1, a second switch SW2, a third switch SW3, a fourth switch SW4, a fifth switch SW5, a sixth switch SW6, and a control circuit 60. A first terminal of the first switch SW1 is coupled to a first reference voltage VR1. A first terminal of the panel capacitor Cp is coupled to a second terminal of the first switch SW1, and a second terminal of the panel capacitor Cp is coupled to a ground. A first terminal of the second switch SW2 is coupled to the first terminal of the panel capacitor Cp. A first terminal of the third switch SW3 is coupled to a second reference voltage VR2. A first terminal of the variable capacitor Ca is coupled to a second terminal of the third switch SW3, and a second terminal of the variable capacitor Ca is coupled to the ground. The variable capacitor Ca is controlled by the control circuit 60. In other words, the control circuit 60 can determine/adjust the capacitance of the variable capacitor Ca.

A first terminal of the fourth switch SW4 is coupled to the first terminal of the variable capacitor Ca, and the second terminal of the fourth switch SW4 is coupled to the second terminal of the second switch SW2. Wherein, the first switch SW1 and the third switch SW3 are turned on and the second switch SW2 and the fourth switch SW4 are turned off in a charge period of a first clock signal CLK1, and the first switch SW1 and the third switch SW3 are turned off and the second switch SW2 and the fourth switch SW4 are turned on in a detection period of the first clock signal CLK1.

Figure 3:
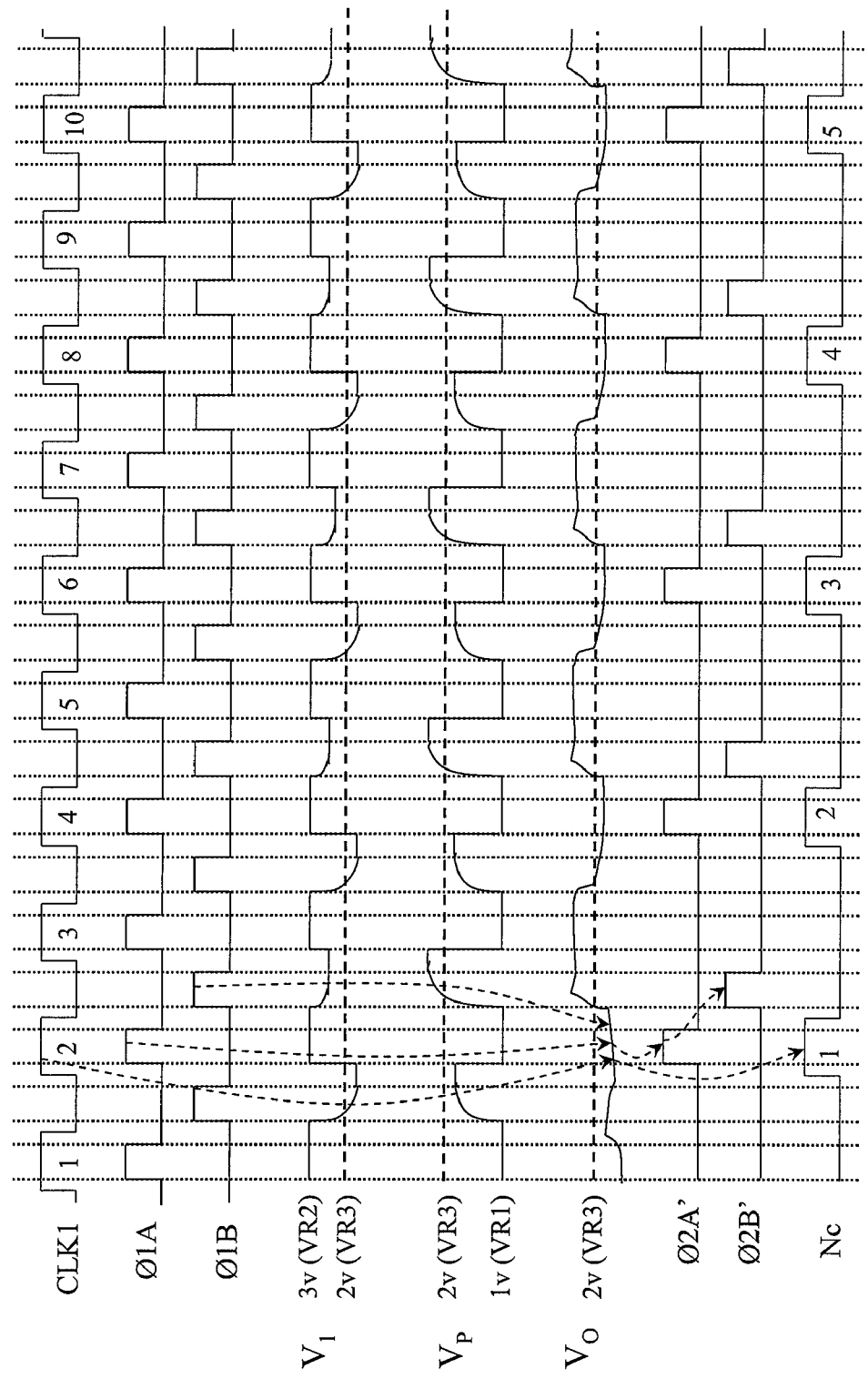
FIG. 3 is a timing diagram of the signals depicted in FIG. 2 in accordance with an embodiment of the invention.

In the present embodiment of the invention, the switched capacitor tracking apparatus 100 further includes a first clock phase generator 22. According to the first clock signal CLK1, the first clock phase generator 22 generates a first phase signal $\Phi 1A$ and a second phase signal $\Phi 1B$. FIG. 3 is a timing diagram of the signals depicted in FIG. 2 in accordance with an embodiment of the invention. In the present embodiment of the invention, the second phase signal $\Phi 1B$ is an inverse signal of first phase signal $\Phi 1A$, and the two signals do not overlap each other. The aforementioned switches SW1 and SW3 are controlled by the first phase signal $\Phi 1A$, and the switches SW2 and SW4 are controlled by the second phase signal $\Phi 1B$. In the present embodiment of the invention, when the first phase signal $\Phi 1A$ is at a high voltage level (i.e. the second phase signal $\Phi 1B$ at a low voltage level), the switches SW1 and SW3 are turned on, whereas the switches SW2 and SW4 are turned off. At this time, the first reference voltage VR1 and the second reference voltage VR2 can respectively charge the panel capacitor Cp and the variable capacitor Ca. Ideally, a voltage Vp at the first terminal of the panel capacitor Cp can be charged to the same level of the first reference voltage VR1. Moreover, a voltage $V_1$ at the first terminal of the variable capacitor Ca can be charged to the same level of the second reference voltage VR2.

When the second phase signal $\Phi 1B$ is at the high voltage level (i.e. the first phase signal $\Phi 1A$ is at the low voltage level), the switches SW1 and SW3 are turned off, whereas the switches SW2 and SW4 are turned on. Consequently, the panel capacitor Cp and the variable capacitor Ca are parallel connected, and the panel capacitor Cp and the variable capacitor Ca are charge sharing. Ideally, if the panel capacitor Cp and the variable Ca have the same capacitance, then after the charge sharing is complete, then a voltage $V_o$ at the second terminal of the second switch is (VR1+VR2)÷2. A third reference voltage VR3 depicted in FIG. 2 can be set at (VR1+VR2)÷2. Therefore, by comparing the third reference voltage VR3 and the voltage $V_o$, the control circuit 60 can determine whether the panel capacitor Cp and the variable capacitor Ca have the same capacitance. If Cp>Ca, then the voltage $V_o$ is between the third reference voltage VR3 and the first reference voltage VR1. Conversely, if Cp<Ca, then the voltage $V_o$ is between the third reference voltage VR3 and the second reference voltage VR2.

According to various design requirements, an user applying the present embodiment of the invention can set the voltage level of the third reference voltage VR3 at predetermined voltage levels. For example, in another embodiment of the invention, the third reference voltage VR3 can be set at (2×VR1+VR2)÷3. Therefore, by comparing the third reference voltage VR3 and the voltage $V_o$, the control circuit 60 can determine whether the panel capacitor Cp has twice the capacitance of the variable capacitor Ca (i.e. Cp:Ca=2:1). If Cp>2Ca, then the voltage V0 is between the third reference voltage VR3 and the first reference voltage VR1. Conversely, if Cp<2Ca, then the voltage $V_o$ is between the third reference voltage VR3 and the second reference voltage VR2.

In other words, the reference voltages VR1, VR2, and VR3 are determined by design requirements. The reference voltages VR1, VR2, and VR3 are correlated by K×(VR1−VR3)=N×(VR3−VR2), in which K and N are real numbers. In the present embodiment of the invention, K and N are both 1, the first reference voltage VR1 is 1V, the second reference voltage VR2 is 3V, and the third reference voltage VR3 is 2V.

Figure 4:
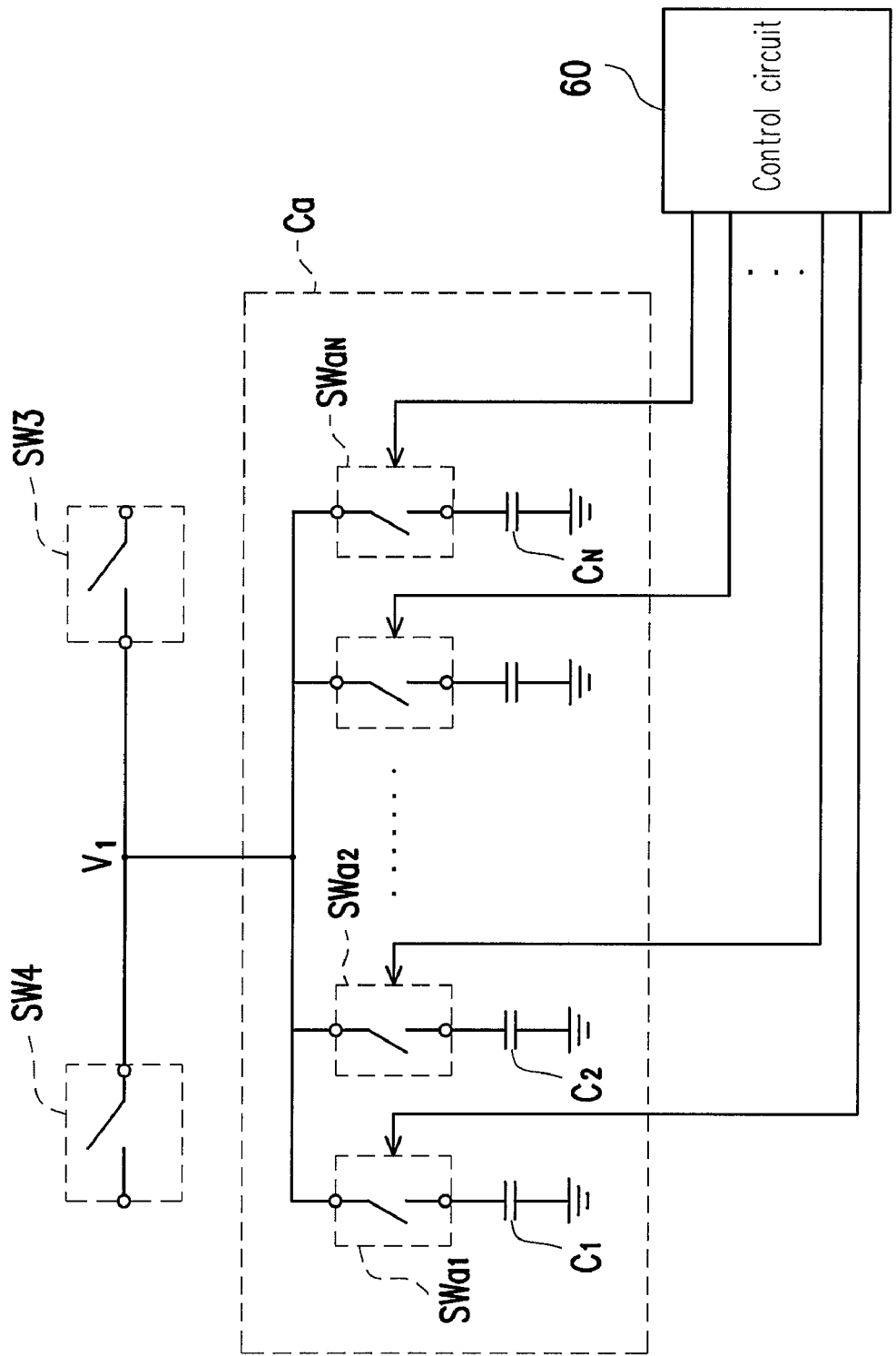
FIG. 4 is a circuit diagram of a variable capacitor depicted in FIG. 2 in accordance with an embodiment of the invention.

The control circuit 60 is coupled to the second terminal of the second switch SW2, so that the control circuit 60 receives the voltage $V_o$. According to an internally recorded first capacitor step value, the control circuit 60 outputs a corresponding N-bit control signal to set the capacitance of the variable capacitor Ca. FIG. 4 is a circuit diagram of a variable capacitor Ca depicted in FIG. 2 in accordance with an embodiment of the invention. Referring to FIG. 4, the variable capacitor Ca includes a plurality of switches $SWa_1$, $SWa_2$, ... $SWa_N$ and a plurality of capacitors $C_1$, $C_2$, ... $C_N$. According to the internally recorded first capacitor step value, the control circuit 60 outputs the corresponding N-bit control signal to control the switches $SWa_1$-$SWa_N$. Therefore, the control circuit 60 can electrically connect one or more of the capacitors $C_1$-$C_N$ to the switches SW3 and SW4, or the control circuit 60 can disconnect all the capacitors $C_1$-$C_N$ from the switches SW3 and SW4. Therefore, according to the internally recorded first capacitor step value, the control circuit 60 can adjust the capacitance of the variable capacitor Ca.

According to various design requirements, an user applying the present embodiment of the invention can determine the capacitances of the capacitors $C_1$-$C_N$. For example, the capacitance of $C_1$ can be $2^0$ pF, the capacitance of $C_2$ can be $2^1$ pF, and the capacitance of $C_n$ can be $2^{(N-1)}$ pF. Consequently, when the N-bit control signal outputted by the control circuit 60 is "0 ... 01", the capacitance of the variable capacitor Ca is $2^0$ pF=1 pF. Moreover, when the control signal outputted by the control circuit 60 is "0 ... 10", the capacitance of the variable capacitor is $2^0$ pF=1 pF. When the control signal outputted by the control circuit 60 is "0 ... 11", the capacitance of the variable capacitor is ($2^0$ pF+$2^1$ pF)=3 pF. In the present embodiment of the invention, the capacitances of the capacitors C1-CN are all step capacitances (i.e. 1 pF). Consequently, when the N-bit control signal outputted by the control circuit 60 is "0 ... 01", the capacitance of the variable capacitor Ca is 1 pF. Moreover, when the control signal outputted by the control circuit 60 is "0 ... 11", the capacitance of the variable capacitor is (1 pF+1 pF)=2 pF.

Referring to FIG. 2, a first terminal of the fifth switch SW5 is coupled to a second reference voltage VR2. A first terminal of the auxiliary capacitor Cb is coupled to a second terminal of the fifth switch SW5, and a second terminal of the auxiliary capacitor Cb is coupled to the ground. A first terminal of the sixth switch SW6 is coupled to the first terminal of the auxiliary capacitor Cb, and a second terminal of the sixth switch SW6 is coupled to the second terminal of the second switch SW2. According to various design requirements, an user applying the present embodiment of the invention can determine the capacitance of the auxiliary capacitance Cb. In the present embodiment of the invention, the capacitance of the auxiliary capacitor Cb is substantially the same as one step capacitance of the variable capacitor Ca. For example, if the control circuit 60 adds 1 pF to the variable capacitor Ca for each increase (for each step), then the capacitance of the auxiliary capacitor Cb can be 1 pF.

The control circuit 60 compares the third reference voltage VR3 with the voltage $V_o$ at the second terminal of the second switch SW2, so that a comparison result is obtained by the control circuit 60. According to this comparison result, the control circuit 60 determines whether to generate a phase signal Φ2A' and a phase signal Φ2B' to respectively control the fifth switch SW5 and the sixth switch SW6. When the voltage $V_o$ is larger than the third reference voltage VR3, the control circuit 60 does not output the phase signals Φ2A' and Φ2B' (i.e. the phase signals Φ2A' and Φ2B' are kept at the low level). Therefore, the fifth switch SW5 and the sixth switch SW6 are both turned off. Here, the voltages Vo, Vp, $V_1$ depicted in FIG. 2 are correlated by $V_o$=(VR1×Cp+VR2×Ca)÷(Cp+Ca). Since the present embodiment sets the three reference voltages VR1, VR2, and VR3 respectively at 1V, 3V, and 2V, the voltage $V_o$=(VR1×Cp+VR2×Ca)÷(Cp+Ca). If Cp=Ca, then $V_o$ equals 2V (i.e. the third reference voltage VR3). If Cp>Ca, then the voltage $V_o$ is less than 2V. Conversely, if Cp<Ca, then the voltage $V_o$ is larger than 2V.

According to the voltage $V_o$ and the third reference voltage VR3, the control circuit 60 generates the phase signal Φ2A' and the phase signal Φ2B' to respectively control the fifth switch SW5 and the sixth switch SW6. In the present embodiment of the invention, the phase signal Φ2B' is an inverse signal of phase signal Φ2A', and the two signals do not overlap each other (as shown in FIG. 3). When the voltage $V_o$ is smaller than the third reference voltage VR3, and a rising edge of the first phase signal Φ1A is detected by the control circuit 60, the control circuit 60 generates a corresponding pulse in the phase signal Φ2A'. As shown in FIG. 3, when the pulse appears in the phase signal Φ2A', and a rising edge of the second phase signal ΦMB is detected by the control circuit 60, the control circuit 60 generates a corresponding pulse in the phase signal Φ2A'. In other words, when the comparison result shows that the third reference voltage VR3 is larger than the voltage $V_o$ at the second terminal of the second switch SW2, the control circuit 60 can employ the first phase signal Φ1A and the second phase signal Φ1B to respectively control the fifth switch SW5 and the sixth switch SW6.

When the phase signal Φ2A' is at the high voltage level (i.e. the phase signal Φ2B' is at the low voltage level) and the switch SW6 is turned off, the second reference voltage VR2 can charge the auxiliary capacitor Cb. When the phase signal Φ2B' is at the high voltage level (i.e. the phase signal Φ2A' is at the low voltage level) and the switch SW6 is turned on, the auxiliary capacitor Cb is coupled to the second terminal of the switch SW2. At this time, the three voltages Vo, Vp, and $V_1$ are related by $V_o$=[VR1×Cp+VR2×(Ca+Cb)]÷(Cp+Ca+Cb) =[Cp+3×(Ca+Cb)]÷(Cp+Ca+Cb).

In other words, if Ca<Cp<Ca+Cb, then the comparison results accumulated in this statistics period are not all 0 or not all 1. If Ca<Cp<Ca+Cb, then the control circuit 60 intermittently outputs the phase signals Φ2A' and Φ2B' within a predetermined statistics period. In this predetermined statistics period (e.g., in the $2^{16}$=65536 clock cycles of the first clock signal CLK1), the control circuit 60 accumulates a plurality of comparison results of multiple comparisons (e.g., accumulates a pulse count of the phase signal Φ2A') and outputs an accumulated result Nc. From a time length of the accumulated result Nc and the statistics period, the capacitance of the panel capacitor Cp can be determined. For example, if the time length of the statistics period is 65536 clock cycles, and the time length of the accumulated result Nc is 32768 clock cycles, then the capacitance of the panel capacitor Cp is Ca+(32768÷65536)×Cb. Since the capacitances of the variable capacitor Ca and the auxiliary capacitor Cb are known, the capacitance of the panel capacitor Cp can be determined. For instance, the control circuit 60 can set the capacitance of the variable capacitor Ca at 20 step capacitances (e.g., 20×1 pF) and the capacitance of the auxiliary capacitor Cb at 1 pF, then the capacitance of the panel capacitor Cp=20+(32768÷65536)×1=20.5 pF.

When the capacitance of the panel capacitor Cp changes, as long as Cp varies between a range of Ca~Ca+Cb, the switched-capacitor tracking apparatus 100 can automatically track the capacitance variation of the panel capacitor Cp by following the aforementioned steps. Therefore, the present embodiment can track, with a higher resolution, the capacitance variation within the range of Ca to Ca+Cb for the panel capacitor Cp. Using the touch panel as an exemplary application, the capacitance of a pixel capacitor (e.g., the panel capacitor Cp) has an intrinsic component and a variation component (i.e. the capacitance variation when the touch panel is touched). After adjusting the variable capacitor Ca close to the intrinsic component of the panel capacitor Cp, the switched-capacitor tracking apparatus 100 of the present embodiment only detects the variation component, thereby enhancing the differentiation capability for sensing capacitor variation (i.e. increase in resolution).

If the capacitance variation of the panel capacitor Cp is too large, thus causing Cp to surpass the range of Ca~Ca+Cb, the switched-capacitor tracking apparatus 100 can obtain the accumulated result Nc showing Cp>Ca+Cb or Cp<Ca by following the aforementioned steps. If the accumulated result Nc shows that in this statistics period, the comparison results are all a first logic value (e.g., a logic value 1), then the voltage V0 is smaller than the third reference voltage VR3 within the statistics period, or Cp>Ca+Cb. Consequently, the control circuit 60 increases an internally recorded first capacitor step value (e.g., increasing by one step). In other words, the control circuit 60 increases the capacitance of the variable capacitor Ca (e.g., increasing by 1 pF). If the accumulated result Nc shows that in this statistics period, the comparison results are all a second logic value (e.g., a logic value 0), then the voltage V0 is larger than the third reference voltage VR3 within the statistics period, or Cp<Ca. Consequently, the control circuit 60 decreases the internally recorded first capacitor step value (e.g., decreasing by one step). In other words, the control circuit 60 decreases the capacitance of the variable capacitor Ca (e.g., decreasing by 1 pF). The above-described adjustments to the capacitance of the variable capacitor Ca are repeatedly performed, until the comparison results within the statistics period are not all 1 (or 0). Therefore, the switched-capacitor tracking apparatus 100 of the present embodiment can automatically track the capacitance variation of the panel capacitor Cp.

Figure 5:
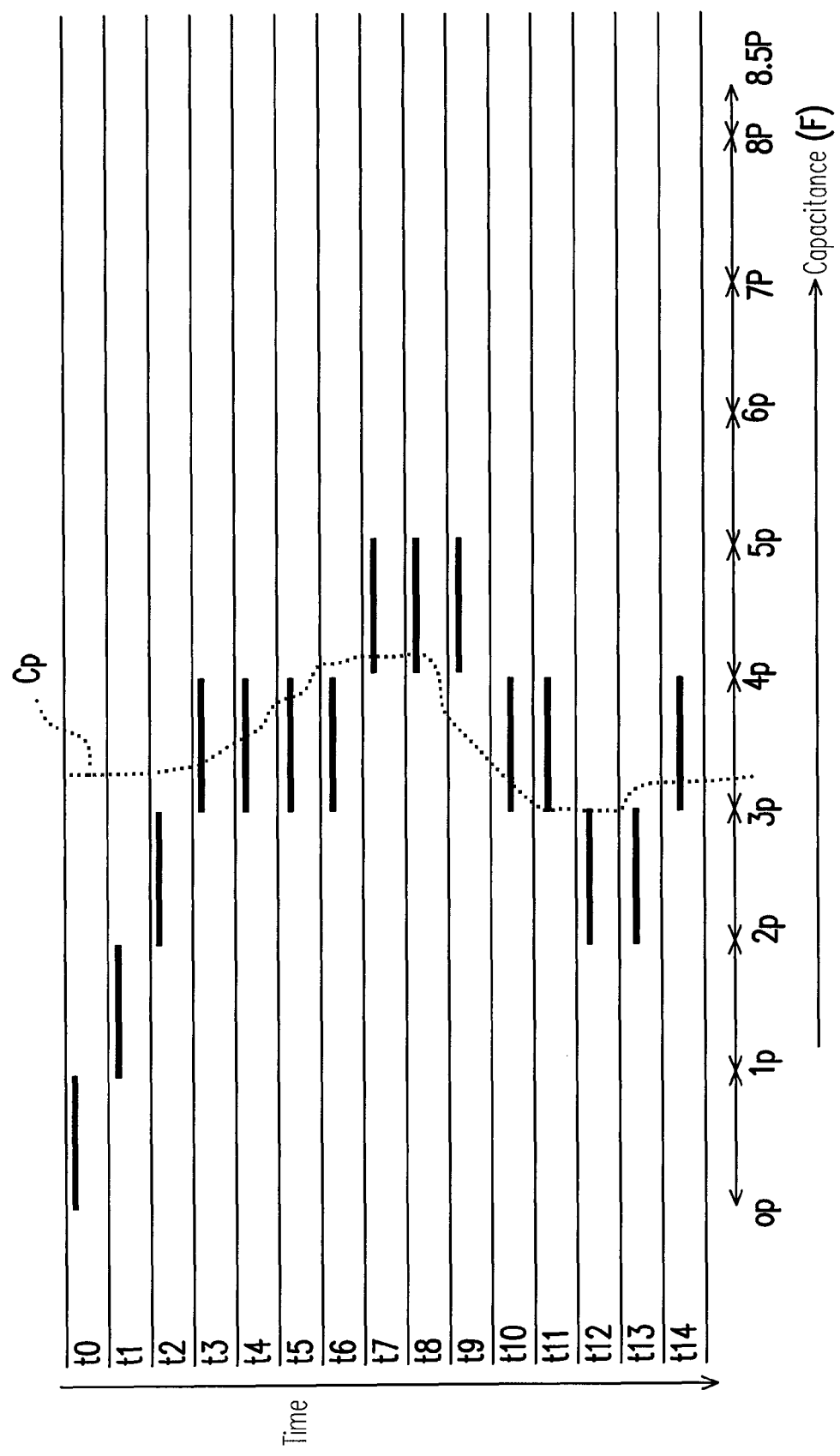
FIG. 5 is a diagram illustrating an operating method of the switched-capacitor tracking apparatus depicted in FIG. 2 in accordance with an embodiment of the invention.

FIG. 5 is a diagram illustrating an operating method of the switched-capacitor tracking apparatus 100 of FIG. 2 in accordance with an embodiment of invention. First, a period of a plurality of clock cycles in the first clock signal CLK1 is defined as a statistics period. For example, the 65536 clock cycles in the first clock signal CLK1 are defined as the statistics period (e.g., a time t0, t1, t2, ... t13, or t14 as shown in FIG. 5). In any one of the statistics period, the capacitance of the variable capacitor Ca is set according to the internally recorded first capacitor step value in the control circuit 60, and the aforementioned operation is repeatedly performed. This operation includes: turning on switches SW1 and SW3 during a charge period (e.g., the phase signal Φ1A at the high voltage level) in the clock cycles of the first clock signal CLK1, and turning off switches SW2 and SW4; turning off switches SW1 and SW3 during a detection period (e.g., the phase signal 11B at the high voltage level) of the clock cycles of the first clock signal CLK1, and turning on switches SW2 and SW4; comparing voltages VR3 and $V_o$ to obtain the comparison result; controlling the switches SW5 and SW6 by using the comparison result; accumulating the comparison results during the statistics period; if all the comparison results in the statistics period are logic 1, then the first capacitor step value is increased by one step; if all the comparison results in the statistics period are logic 0, then the first capacitor step value is decreased by one step.

After the above-described comparison between the voltages VR3 and $V_o$, when the comparison result shows that the voltage VR3 is larger than the voltage $V_o$, the switch SW5 is turned on and the switch SW6 is turned off during the charge period of the first clock signal, and the switch SW5 is turned off and the switch SW6 is turned on during the detection period of the first clock signal. When the comparison result shows that the voltage VR3 is smaller than the voltage Vo, the switches SW5 and SW6 are turned off.

The bold thick lines illustrated in FIG. 5 between each of the statistics periods represent the capacitance range the switched-capacitor tracking apparatus 100 can detect at the time. This capacitance range is Ca~(Ca+Cb). Referring to FIGS. 2 and 5 concurrently, suppose an initial value of the first capacitor step value is 0. Consequently, in the statistics period t0, the control circuit 60 correspondingly sets the variable capacitor Ca at 0 pF. Since the capacitance of the auxiliary capacitor Cb is 1 pF, in the statistics period t0, the capacitance range the switched-capacitor tracking apparatus 100 can detect is 0 pF~1 pF. Thereafter, the switched-capacitor tracking apparatus 100 begins the aforementioned operation to track the panel capacitor Cp. As shown in FIG. 5, because the capacitance of the panel capacitor Cp during the statistics period t0 is between a range of 3 pF~4 pF, and since Ca+Cb is less than Cp at this time, consequently all the comparison results in the statistics period t0 are logic value 1. After the statistics period t0 ends, according to the accumulated result Nc, the control circuit 60 increases the internally recorded first capacitor step value by one step (i.e. sets a "1"). Moreover, according to the new first capacitor step value, the control circuit 60 adjusts the capacitance of the variable capacitor Ca (i.e. adjusts to 1 pF).

After the statistics period t0 ends, the statistics period t1 begins. In the statistics period t1, the capacitance of the variable capacitor Ca is 1 pF, and the capacitance of the auxiliary capacitor Cb is also 1 pF, therefore the capacitance range the switched-capacitor tracking apparatus 100 can detect is 1 pF~2 pF. The control circuit 60 performs the same operation again so as to obtain another accumulated result Nc. As clearly shown in FIG. 5, Ca+Cb is less than Cp in this time period. Therefore, after the statistics period t1 ends, the control circuit 60 again adjusts the first capacitor step value to "2", and according to the new first capacitor step value, the control circuit 60 correspondingly adjusts the capacitance of the variable capacitor Ca to 2 pF.

After the statistics period t2 begins, the capacitance range the switched-capacitor tracking apparatus 100 can detect is adjusted to 2 pF~3 pF. As clearly shown in FIG. 5, Ca+Cb is less than Cp in this time period. Therefore, after the statistics period t2 ends, the control circuit 60 again adjusts the first capacitor step value to "3", and according to the new first capacitor step value, the control circuit 60 correspondingly adjusts the capacitance of the variable capacitor Ca to 3 pF.

After the statistics period t3 begins, the capacitance range the switched-capacitor tracking apparatus 100 can detect is adjusted to 3 pF~4 pF. The control circuit 60 repeats the aforementioned operation and obtains the new accumulated result Nc in the statistics period t3. Heretofore, the switched-capacitor tracking apparatus 100 can automatically track the capacitance of the panel capacitor Cp. From the time length of the accumulated result Nc and the statistics period t3, the capacitance of the panel capacitor Cp can be determined.

As shown in FIG. 5, assume the capacitance of the panel capacitor Cp changes between the statistics period t3 and the statistics period t6. From the statistics period t3 to the statistics period t5, the capacitance variation of the panel capacitor Cp is within the range of Ca~Ca+Cb, therefore the control circuit 60 does not need to change the capacitance of the variable capacitor Ca. After the statistics period t6 begins, the detectable capacitance range of the switched-capacitor tracking apparatus 100 is maintained the same as in the range of the statistics period t5 (i.e. 3 pF~4 pF). However, since the panel capacitor Cp exceeds the Ca~Ca+Cb range in the statistics period t6, therefore after the statistics period t6 ends, the control circuit 60 again adjusts the first capacitor step value to "4". Moreover, according to the new first capacitor step value, the control circuit 60 correspondingly adjusts the capacitance of the variable capacitor Ca to 4 pF.

As shown in FIG. 5, assume the capacitance of the panel capacitor Cp changes between the statistics period t8 and the statistics period t10. During the statistics period t9, since the capacitance of the panel capacitor Cp is adjusted to be lower than the variable capacitor Ca, all the comparison results obtained in the statistics period t9 are logic 0. After the statistics period t9 ends, according to the accumulated result Nc, the control circuit 60 decreases the internally recorded first capacitor step value by one step (i.e. sets a "3"). Moreover, according to the new first capacitor step value, the control circuit 60 adjusts the capacitance of the variable capacitor Ca (i.e. adjusts to 3 pF). The operation for other statistics periods can be referred to the above descriptions, therefore no further description is provided hereinafter.

Figure 6:
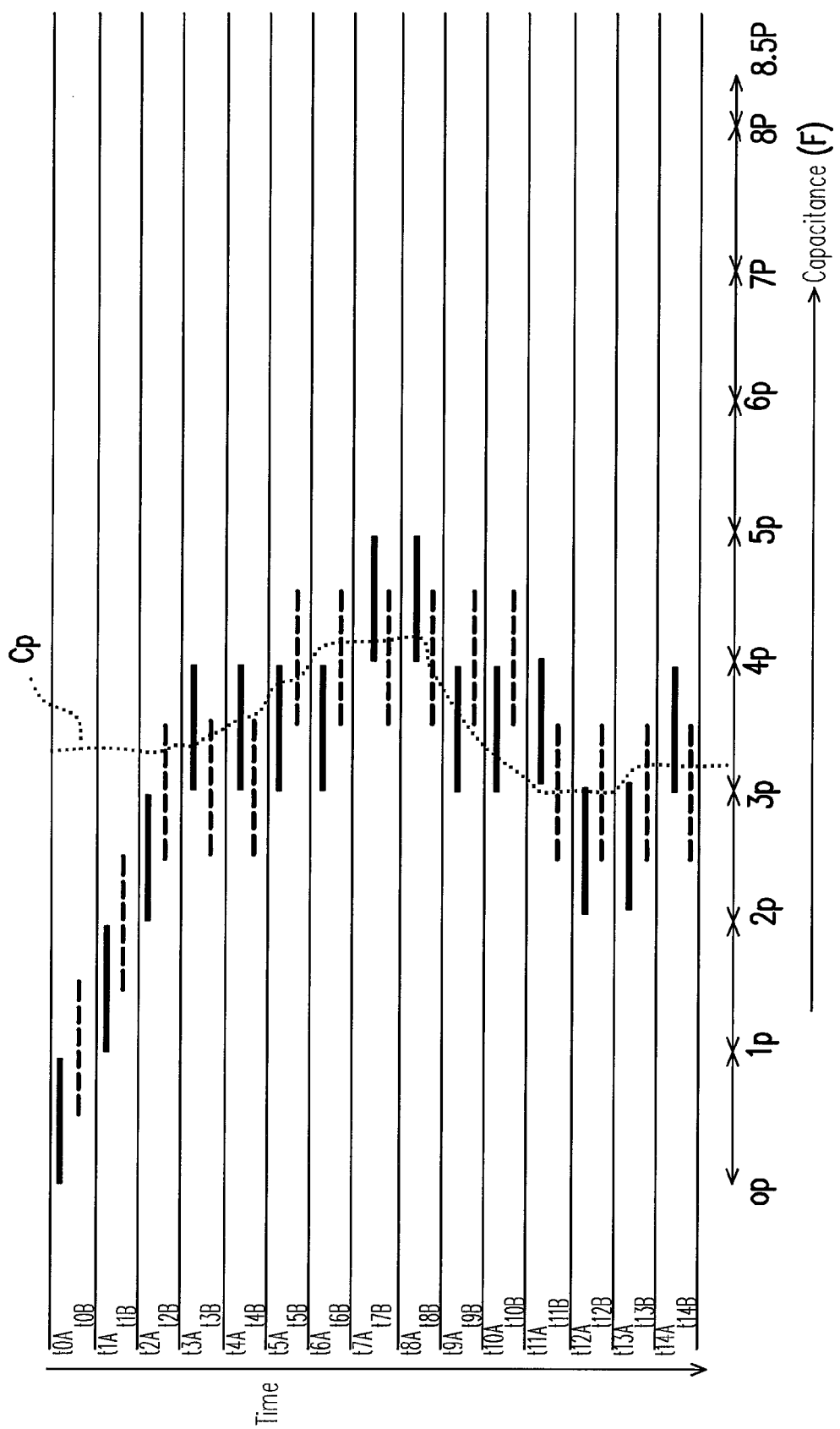
FIG. 6 is a diagram illustrating the operating method of the switched-capacitor tracking apparatus depicted in FIG. 2 in accordance with another embodiment of the invention.

Those who use the above-described embodiment can freely change the implementation method based on the requirements of design. For example, FIG. 6 is a diagram illustrating the operating method of the switched-capacitor tracking apparatus 100 of FIG. 2 in accordance with another embodiment of the invention. Since FIG. 6 is similar to FIG. 5, the description of like parts is omitted. In the embodiment illustrated in FIG. 6, after the first statistics period (i.e. the time t0A, t1A, . . . , t13A, or t14A shown in FIG. 6) ends, a period of another plurality of clock cycles of the first clock signal CLK1 is defined as the second statistics period (i.e. the time t0B, t1B, . . . , t13B, or t14B shown in FIG. 6). The first statistics period and the second statistics period have the same time length. The operation of the switched-capacitor tracking apparatus 100 in the first statistics period t0A~t14A and the second statistics period t0B~t14B is the same as the statistics period t0~t14 of FIG. 5.

In the present embodiment of the invention, the control circuit 60 internally records the first capacitor step value and a second capacitor step value, in which the first capacitor step value and the second capacitor step value differ by half a step. The initial value of the first capacitor step value is assumed to be 0, while the initial value of the second capacitor step value is assumed to be 0.5. Firstly, the switched-capacitor tracking apparatus 100 detects the panel capacitor Cp during the first statistics period t0A. Consequently, in the first statistics period t0A, the control circuit 60 correspondingly sets the variable capacitor Ca to 0 according to the first capacitor step value. In other words, the detectable capacitance range of the switched-capacitor tracking apparatus 100 is 0 pF~1 pF. In the first statistics period t0A, since Ca+Cb is less than Cp, the comparison results in the first statistics period t0A are all logic 1. After the first statistics period t0A ends, the second statistics period t0B begins. In the second statistics period t0B, the control circuit 60 correspondingly sets the variable capacitor Ca to 0.5 pF according to the second capacitor step value. In other words, the detectable capacitance range of the switched-capacitor tracking apparatus 100 is 0.5 pF~1.5 pF. In the second statistics period t0B, since Ca+Cb is less than Cp, the comparison results in the second statistics period t0B are all logic 1.

After the first statistics period t0A and the second statistics period t0B ends, in order to determine the capacitance of the panel capacitor Cp, the control circuit 60 chooses one accumulated result Nc from these two periods. In light of the foregoing description, the switched-capacitor tracking apparatus 100 has not yet lock in the capacitance of the panel capacitor Cp during the first statistics period t0A and the second statistics period t0B. Consequently, the control circuit 60 increases the internally recorded first capacitor step value and the second capacitor step value by one step. In other words, the control circuit 60 sets the first capacitor step value at 1 and sets the second capacitor step value at 1.5.

In the first statistics period t1A, the control circuit 60 adjusts the capacitance of the variable capacitor Ca according to the new first capacitor step value. Therefore, the capacitance range the switched-capacitor tracking apparatus 100 can detect is 1 pF~2 pF. In the second statistics period t1B, the control circuit 60 adjusts the capacitance of the variable capacitor Ca according to the new second capacitor step value. Therefore, the capacitance range the switched-capacitor tracking apparatus 100 can detect is 1.5 pF~2.5 pF. The switched-capacitor tracking apparatus 100 has not yet lock in the capacitance of the panel capacitor Cp during the first statistics period t1A and the second statistics period t1B. Consequently, the control circuit 60 increases the first capacitor step value to 2 and increases the second capacitor step value to 2.5.

In the first statistics period t2A, the control circuit 60 adjusts the capacitance of the variable capacitor Ca to 2 pF according to the adjusted first capacitor step value. Therefore, the capacitance range the switched-capacitor tracking apparatus 100 can detect is 2 pF~3 pF. The comparison results the control circuit 60 obtains in the first statistics period t2A are still all logic 1, therefore the control circuit 60 increases the first capacitor step value to 3. In the second statistics period t2B, the control circuit 60 adjusts the capacitance of the variable capacitor Ca to 2.5 pF according to the adjusted second capacitor step value. Therefore, the capacitance range the switched-capacitor tracking apparatus 100 can detect is 2.5 pF~3.5 pF. At this time, the switched-capacitor tracking apparatus 100 can lock in/detect the capacitance of the panel capacitor Cp. Consequently, the control circuit 60 maintains the second capacitor step value at 2.5. After the first statistics period t2A and the second statistics period t2B ends, the control circuit 60 chooses the accumulated result Nc obtained during the second statistics period t2B, in order to determine the capacitance of the panel capacitor Cp.

In the first statistics period t3A, the control circuit 60 adjusts the capacitance of the variable capacitor Ca to 3 pF according to the new first capacitor step value. Therefore, the capacitance range the switched-capacitor tracking apparatus 100 can detect is 3 pF~4 pF in the first statistics period t3A. At this time, the switched-capacitor tracking apparatus 100 can lock in/detect the capacitance of the panel capacitor Cp. Consequently, the control circuit 60 maintains the first capacitor step value at 3. In the second statistics period t3B, the control circuit 60 returns the capacitance of the variable capacitor Ca to 2.5 pF according to the second capacitor step value. Therefore, the capacitance range the switched-capacitor tracking apparatus 100 can detect is 2.5 pF~3.5 pF in the second statistics period t3B. At this time, the capacitance variation of the panel capacitor Cp is still within the range of Ca~Ca+Cb, therefore the control circuit 60 maintains the second capacitor step value at 2.5. After the first statistics period t3A and the second statistics period t3B ends, the two accumulated results Nc obtained by the control circuit 60 in the statistics periods t3A and t3B are both effective. Since the control circuit 60 previously chose the accumulated result Nc obtained in the second statistics period t2B, by now choosing the accumulated result Nc obtained in the second statistics period t3B, the control circuit 60 can determine the capacitance of the panel capacitor Cp.

As shown in FIG. 6, assume the capacitance of the panel capacitor Cp changes between the first statistics period t3A and the first statistics period t6A. During the statistics periods t4A and t4B, the control circuit 60 correspondingly adjusts the capacitance of the variable capacitor Ca according to the first capacitor step value and the second capacitor step value, respectively. As shown in FIG. 6, an effective accumulated result Nc can be obtained in the first statistics period t4A. However, in the second statistics period t4B, since the panel capacitor Cp exceeds the Ca~Ca+Cb range, all the comparison results are logic 1. Consequently, the control circuit 60 increases the second capacitor step value to 3.5. On the other hand, since the accumulated accumulated result Nc obtained in the second statistics period t4B is ineffective, by now choosing instead the accumulated result Nc obtained in the first statistics period t4A, the control circuit 60 can determine the capacitance of the panel capacitor Cp.

During the statistics periods t5A and t5B, the control circuit 60 correspondingly adjusts the capacitance of the variable capacitor Ca according to the first capacitor step value and the second capacitor step value, respectively. Consequently, two effective accumulated results Nc are obtained. Since the control circuit 60 previously chose the accumulated result Nc obtained in the first statistics period t4A, by now choosing the accumulated result Nc obtained in the first statistics period t5A, the control circuit 60 can determine the capacitance of the panel capacitor Cp.

As shown in FIG. 6, in the first statistics period t6A, since the panel capacitor Cp exceeds the Ca~Ca+Cb range, all the comparison results are logic 1. Consequently, the control circuit 60 increases the first capacitor step value to 4. In the second statistics period t6B, the control circuit 60 can still obtain an effective accumulated result Nc. Since the accumulated result Nc obtained in the first statistics period t6A is ineffective, in order to determine the capacitance of the panel capacitor Cp, the control circuit 60 chooses instead the accumulated result obtained in the second statistics period t6B.

In the statistics periods t7A and t7B, the control circuit 60 can obtain two effective accumulated results Nc. The control circuit 60 chooses the effective accumulated result Nc obtained in the second statistics period t7B. The control circuit 60 obtains two effective accumulated results Nc in the statistics periods t8A and t8B, and the control circuit 60 chooses the accumulated result Nc obtained in the second statistics period t8B.

It should be noted that although both of the accumulated results Nc obtained in the statistics periods t8A and t8B are effective, the two accumulated results Nc are both smaller than a middle value thereof (i.e. half of the range of Nc). Consequently, the control circuit 60 adjusts the first capacitor step value or the second capacitor step value down one step. The steps of the adjustment includes decreasing a step of the first capacitor step value if the first capacitor step value is larger than the second capacitor step value. Conversely, the second capacitor step value is decreased by one step. When the second statistics period t8B ends, since the first capacitor step value is 4 and the second capacitor step value is 3.5, the control circuit 60 decreases the first capacitor step value to 3.

Similarly, although both of the accumulated results Nc obtained in the first statistics period and the second statistics period are effective, the control circuit 60 adjusts the first capacitor step value or the second capacitor step value up one step if the two accumulated results Nc are both larger than the middle value (i.e. half of the range of Nc). The steps of the adjustment includes increasing a step of the first capacitor step value if the first capacitor step value is smaller than the second capacitor step value. Conversely, the second capacitor step value is increased by one step. The first and the second capacitor step values are maintained when one of the first and the second accumulated values is smaller than the middle value and another one of the first and the second accumulated values is larger than the middle value.

Accordingly, a locking time of the switched-capacitor tracking apparatus 100 can be shortened. The operation for other statistics periods t9A~t14A and t9B~t14B can be referred to the above descriptions, therefore no further description is provided hereinafter. Therefore, the switched-capacitor tracking apparatus 100 of the present embodiment can automatically track the capacitance variation of the panel capacitor Cp.

Figure 7:
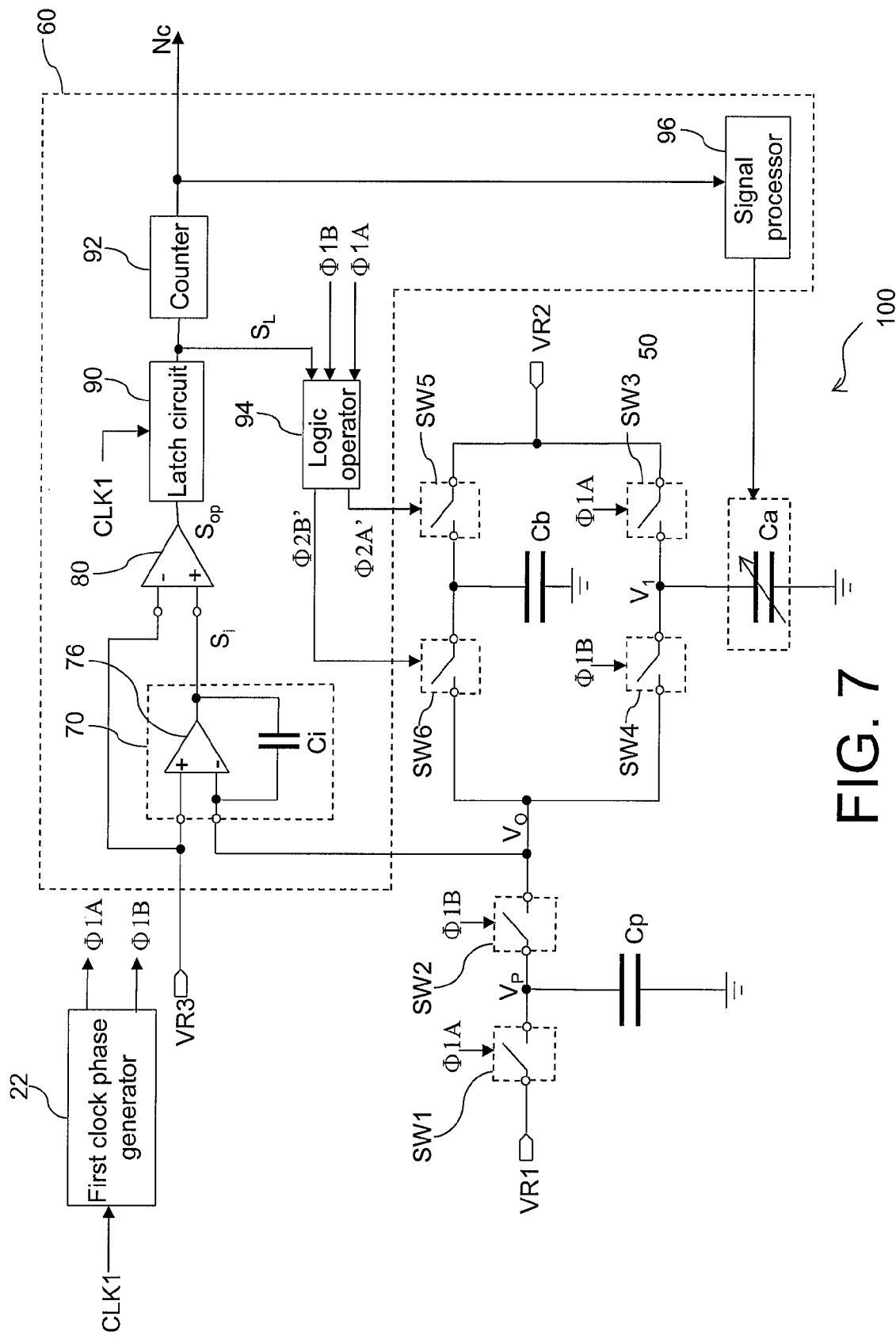
FIG. 7 is a circuit block diagram of a control circuit depicted in FIG. 2 in accordance with an embodiment of the invention.
Figure 8:
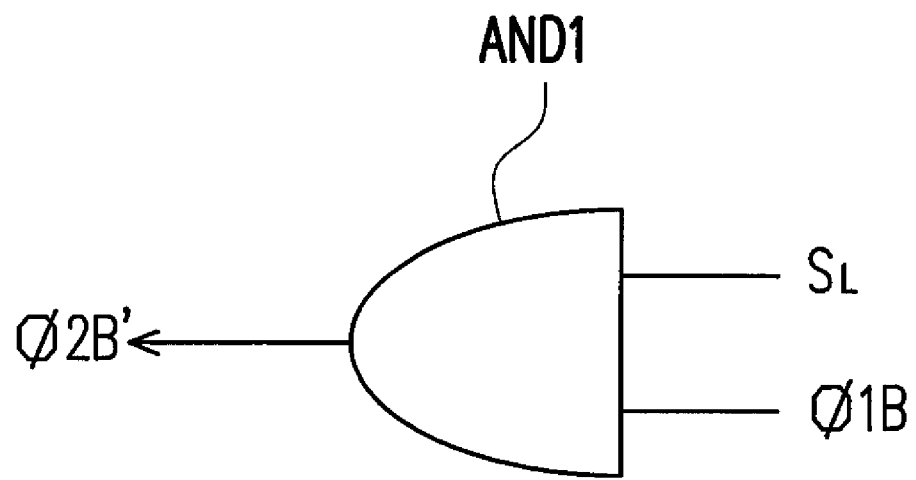
FIG. 8 is a circuit diagram of a logic operator depicted in FIG. 7 in accordance with an embodiment of the invention.
Figure 8:
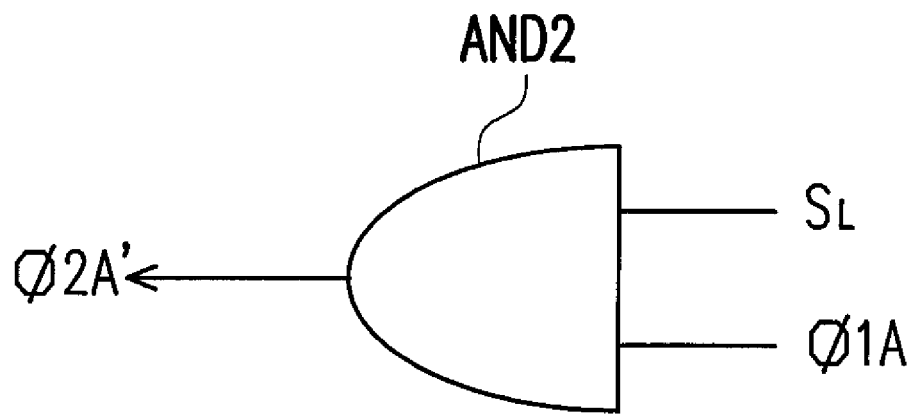

FIG. 7 is a circuit block diagram of a control circuit 60 depicted in FIG. 2 in accordance with an embodiment of the invention. Referring to FIG. 7, the control circuit 60 includes a logic operator 94 that determines whether to transmit the first phase signal Φ1A and the second phase signal Φ1B to the fifth switch SW5 and the sixth switch SW6, according to a comparison result $S_L$. Those using the present embodiment of the invention can implement the logic operator 94 in any manner. For example, FIG. 8 is a circuit diagram of the logic operator 94 depicted in FIG. 7 in accordance with an embodiment of the invention. The logic operator 94 includes an and gate AND1 and an and gate AND2. Two input terminals of the and gate AND1 respectively receives the comparison result $S_L$ and the second phase signal Φ1B, and an output terminal of the and gate AND1 outputs the phase signal Φ2B' to the sixth switch SW6. Two input terminals of the and gate AND2 respectively receives the comparison result $S_L$ and the first phase signal Φ1A, and the output terminal of the and gate AND2 outputs the phase signal Φ2A' to the fifth switch SW5.

The control circuit 60 depicted in FIG. 7 further includes an integrator 70, a comparator 80, and a latch circuit 90. In order to receive the voltage $V_o$, the input terminal of the integrator 70 is coupled to the second terminal of the second switch SW2. The integrator 70 includes an operational amplifier 76 and a feedback capacitor Ci. A first input terminal of the operational amplifier 76 (e.g., an non-inverting input terminal) is coupled to the third reference voltage VR3, and a second input terminal of the operational amplifier 76 (e.g., an inverting input terminal) receives the voltage $V_o$. An output terminal of the operational amplifier 76 is used as an output terminal of the integrator 70 to output an integral result $S_i$. An first terminal and an second terminal of the feedback capacitor Ci are respectively coupled to the second input terminal and the output terminal of the operational amplifier 76. The integrator 70 can perform an integral operation on the voltage $V_o$, and thereafter transmit the integral result to the comparator 80.

A first input terminal of the comparator 80 (e.g., an inverting input terminal) is coupled to the third reference voltage, and a second input terminal (e.g., an non-inverting input terminal) is coupled to the output terminal of the integrator 70. The comparator 80 compares the integral result from the integrator 70 with the third reference voltage VR3, and thereafter transmits an comparison result $S_{op}$ to the latch circuit 90. An input terminal of the latch circuit 90 is coupled to the output terminal of comparator 80. A trigger terminal of the latch circuit 90 receives the first clock signal CLK1. According to a trigger timing of the first clock signal CLK1, the latch circuit 90 samples the comparison result $S_{op}$, and thereafter provides the latched comparison result $S_L$ to the logic operator 94. When the capacitance of the panel capacitor Cp is within the range of Ca~(Ca+Cb), a ratio of (Cp−Ca) to Cb is approximately equal to a ratio of the time the comparison result $S_L$ is logic 1 to the statistics period. For example, if during the statistics period (100 clock cycles), the time the comparison result $S_L$ is logic 1 is approximately 50 clock cycles, then the ratio of (Cp−Ca) to Cb is approximately 1:2, or that Cp is approximately equal to Ca+Cb/2. Therefore, by statistically analyzing the frequency/time in which the comparison result $S_L$ is logic 1 in the statistics period, the capacitance of the panel capacitor Cp can be derived.

The control circuit 60 depicted in FIG. 7 further includes a counter 92 and a signal processor 96. In order to accumulate the comparison result $S_L$ and to transmit the accumulated result Nc, an input terminal of the counter 92 is coupled to the output terminal of the latch circuit 90. According to the accumulated result Nc, the signal processor 96 controls the variable capacitor Ca. If the accumulated result Nc is the largest value, then all the comparison results $S_L$ in the statistics period are the first logic value (e.g., logic 1). In other words, Ca+Cb is less than Cp. Therefore, when the accumulated result Nc is the largest value, the signal processor 96 controls the variable capacitor Ca to increase a step capacitance (e.g., 1 pF). Conversely, if the accumulated result Nc is the smallest value, then all the comparison results $S_L$ in the statistics period are the second logic value (e.g., logic 0). In other words, Cp is less than Ca. Therefore, when the accumulated result Nc is the smallest value, the signal processor 96 controls the variable capacitor Ca to decrease a step capacitance.

Figure 9:
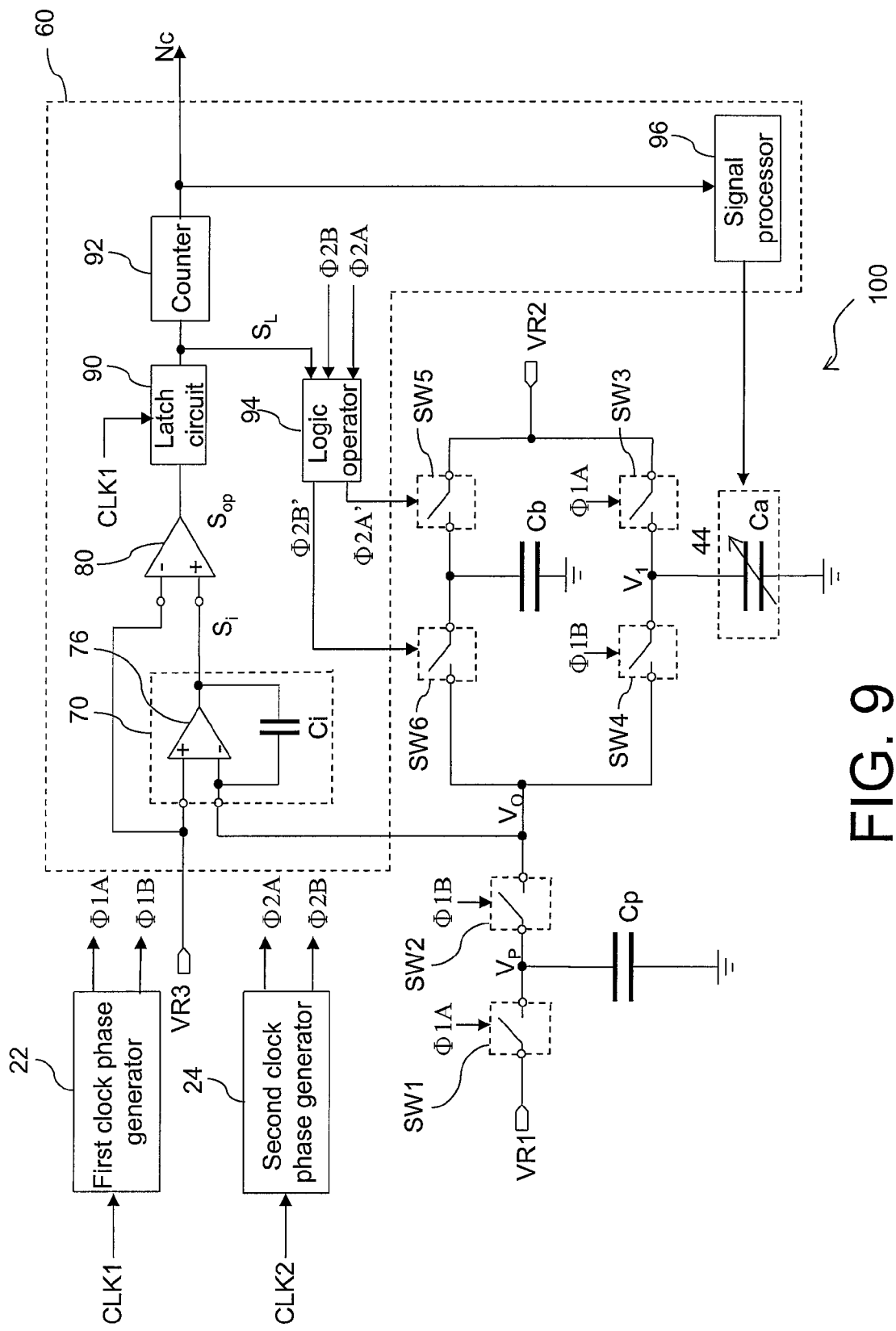
FIG. 9 is a circuit block diagram of the switched-capacitor tracking apparatus 100 depicted in FIG. 2 in accordance with another embodiment of the invention.
Figure 10:
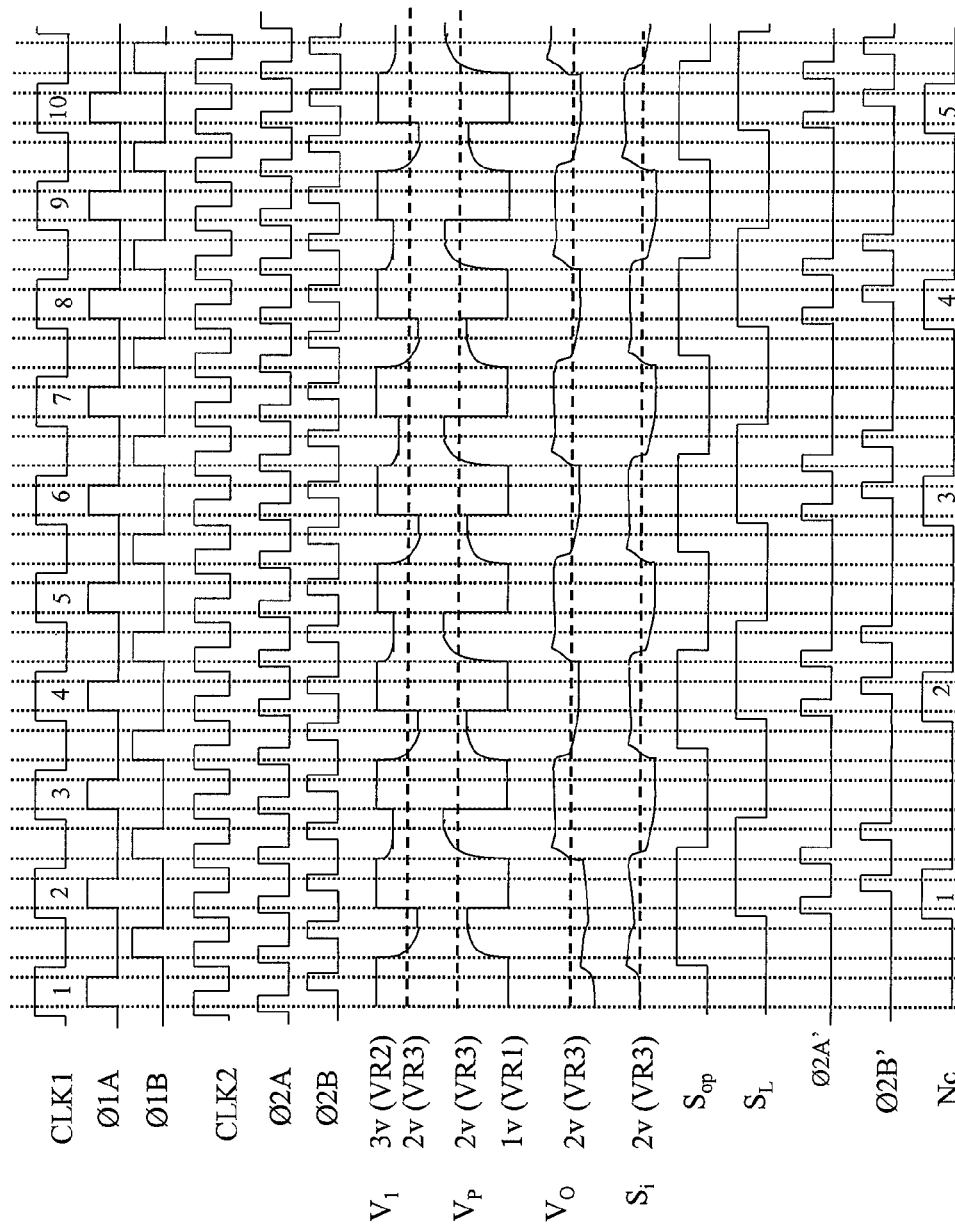
FIG. 10 is a timing diagram of the signals depicted in FIG. 9 in accordance with an embodiment of the invention.

FIG. 9 is a circuit block diagram of the switched-capacitor tracking apparatus 100 depicted in FIG. 2 in accordance with another embodiment of the invention. The switched-capacitor tracking apparatus 100 depicted in FIG. 9 is similar to FIG. 7. A difference between the two lies in that the switched-capacitor tracking apparatus 100 depicted in FIG. 9 further includes a second clock phase generator 24. According to a second clock signal CLK2, the second clock phase generator 24 generates a third phase signal Φ2A and a fourth phase signal Φ2B that are phase-inverted from each other. FIG. 10 is a timing diagram of the signals depicted in FIG. 9 in accordance with an embodiment of the invention. A frequency of the second clock signal is an integer multiple of a frequency of the first clock signal. The second clock phase generator 24 outputs the third phase signal Φ2A and the fourth phase signal Φ2B to the logic operator 94.

Figure 11:
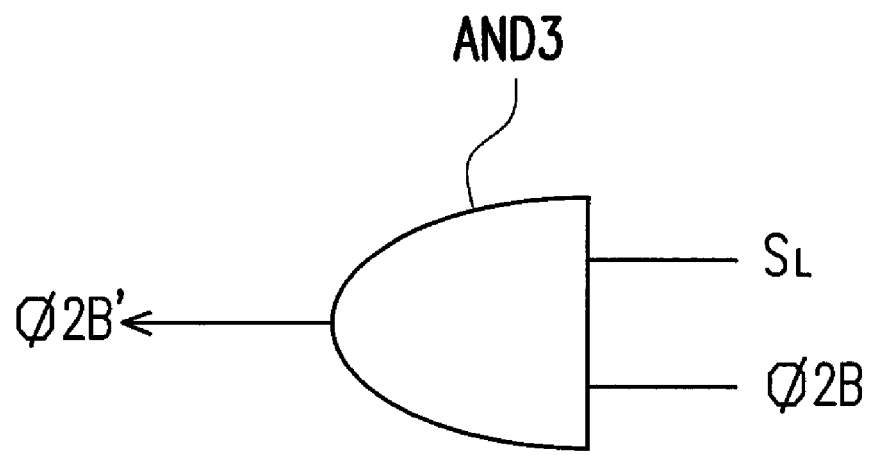
FIG. 11 is a circuit diagram of a logic operator depicted in FIG. 9 in accordance with an embodiment of the invention.
Figure 11:
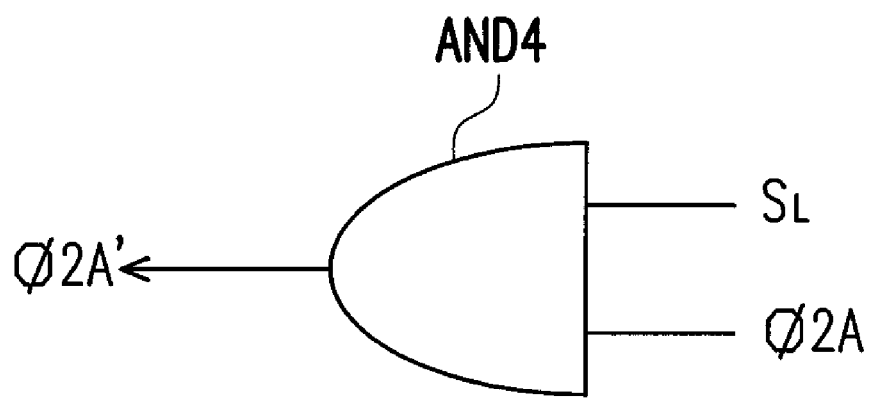

Those using the present embodiment of the invention can implement the logic operator 94 in any manner. For example, FIG. 11 is a circuit diagram of the logic operator 94 depicted in FIG. 9 in accordance with an embodiment of the invention. The logic operator 94 includes an and gate AND3 and an and gate AND4. Two input terminals of the and gate AND3 respectively receives the comparison result $S_L$ and the fourth phase signal Φ2B, and an output terminal of the and gate AND3 outputs the phase signal Φ2B' to the sixth switch SW6. Two input terminals of the and gate AND4 respectively receives the comparison result $S_L$ and the third phase signal Φ2A, and the output terminal of the and gate AND4 outputs the phase signal Φ2A' to the fifth switch SW5. According to the comparison result $S_L$, the logic operator 94 determines whether to transmit the third phase signal Φ2A and the fourth phase signal Φ2B to the fifth switch SW5 and the sixth switch SW6.

Therefore, when the comparison result $S_L$ shows that the third reference voltage VR3 is larger than the voltage $V_o$ at the second terminal of the second switch SW2, the fifth switch SW5 is turned on and the sixth switch SW6 is turned off during the time the third phase signal Φ2A is at the high voltage level (charge period), and the fifth switch SW5 is turned off and the sixth switch SW6 is turned on during the time the fourth phase signal Φ2B is at the high voltage level (detection period). When the comparison result $S_L$ shows that the third reference voltage VR3 is smaller than the voltage $V_o$, the switches SW5 and SW6 are turned off.

In light of the foregoing, by comparing the third reference voltage VR3 and the voltage $V_o$ at the second terminal of the second switch SW2, the above-described embodiments obtain the comparison result $S_L$ in order to dynamically determine whether to parallel connect the auxiliary capacitor Cb to the variable capacitor Ca. Additionally, by accumulating a plurality of comparison results $S_L$ in the statistics period, the capacitance variation between the variable capacitor Ca and the panel capacitor Cp can be known. If Cp>(Ca+Cb), then the first capacitor step value is increased, and if Cp<Ca, then the first capacitor step value is decreased, until Cp is within the range from Ca to (Ca+Cb). Therefore, according to embodiments of the invention, the switched-capacitor tracking apparatus 100 can automatically track the capacitance variation of the panel capacitor Cp. Using the touch panel as an exemplary application, the capacitance of the panel capacitor Cp has an intrinsic component and a variation component (i.e. the capacitance variation when the touch panel is touched). According to embodiments of the invention, after adjusting the variable capacitor Ca close to the intrinsic component of the panel capacitor Cp, the switched-capacitor tracking apparatus 100 only detects the variation component, thereby enhancing the differentiation capability for sensing capacitor variation (i.e. increase in resolution).

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A switched-capacitor tracking apparatus of a touch panel configured to track a capacitance variation of a panel capacitor, comprising:
   a variable capacitor;
   an auxiliary capacitor;
   a first switch having a first terminal coupled to a first reference voltage and a second terminal coupled to the panel capacitor;
   a second switch having a first terminal coupled to the panel capacitor;
   a third switch having a first terminal coupled to a second reference voltage and a second terminal coupled to the variable capacitor;

a fourth switch having a first terminal coupled to the variable capacitor and a second terminal coupled to the second terminal of the second switch, wherein the first switch and the third switch are turned on and the second switch and the fourth switch are turned off in a charge period of a first clock signal, and the first switch and the third switch are turned off and the second switch and the fourth switch are turned on in a detection period of the first clock signal;

a fifth switch having a first terminal coupled to the second reference voltage and a second terminal coupled to the auxiliary capacitor;

a sixth switch having a first terminal coupled to the auxiliary capacitor and a second terminal coupled to the second terminal of the second switch; and a control circuit coupled to the second terminal of the second switch, the control circuit configured to set a capacitance of the variable capacitor according to a first capacitor step value, to compare a third reference voltage and a voltage at the second terminal of the second switch, to control the fifth switch and the sixth switch according to a comparison result, and to accumulate a plurality of the comparison results in a statistics period, wherein if all the comparison results in the statistics period are a first logic value, then the control circuit increases the first capacitor step value, and if all the comparison results in the statistics period are a second logic value, then the control circuit decreases the first capacitor step value.

2. The switched-capacitor tracking apparatus as claimed in claim 1, further comprising:

a first clock phase generator generating a first phase signal and a second phase signal according to the first clock signal;

wherein the first switch and the third switch are controlled by the first phase signal, and the second switch and the fourth switch are controlled by the second phase signal.

3. The switched-capacitor tracking apparatus as claimed in claim 2, wherein the first phase signal and the second phase signal are phase-inverted from each other.

4. The switched-capacitor tracking apparatus as claimed in claim 2, wherein when the comparison result shows the third reference voltage larger than the voltage at the second terminal of the second switch, the control circuit employs the first phase signal and the second phase signal to respectively control the fifth switch and the sixth switch; and when the comparison result shows the third reference voltage smaller than the voltage at the second terminal of the second switch, the control circuit turns off the fifth switch and the sixth switch.

5. The switched-capacitor tracking apparatus as claimed in claim 2, wherein the control circuit comprises:

a logic operator, wherein according to the comparison result, the logic operator determines whether to respectively transmit the first phase signal and the second phase signal to the fifth switch and the sixth switch.

6. The switched-capacitor tracking apparatus as claimed in claim 5, wherein the control circuit further comprises:

an integrator having an input terminal coupled to the second terminal of the second switch;

a comparator having a first input terminal coupled to the third reference voltage and a second input terminal coupled to an output terminal of the integrator; and a latch circuit having an input terminal coupled to an output terminal of the comparator, a trigger terminal receiving the first clock signal, and an output terminal providing the comparison result to the logic operator.

7. The switched-capacitor tracking apparatus as claimed in claim 6, wherein the control circuit further comprises:

a counter having an input terminal coupled to the output terminal of the latch circuit, so as to accumulate a plurality of comparison results in the statistics period and to transmit an accumulated result; and a signal processor controlling the variable capacitor according to the accumulated result, wherein if the accumulated result shows all the comparison results in the statistics period are the first logic value, then the signal processor increases the first capacitor step value one step, so as to control the variable capacitor into increasing a capacitance one step, and if the accumulated result shows all the comparison results in the statistics period are the second logic value, then the signal processor decreases the first capacitor step value one step, so as to control the variable capacitor into decreasing the capacitance one step.

8. The switched-capacitor tracking apparatus as claimed in claim 6, wherein the integrator comprises:

an operational amplifier having a first input terminal coupled to the third reference voltage, a second input terminal coupled to the second terminal of the second switch, and an output terminal used as an output terminal of the integrator; and a feedback capacitor having a first terminal and a second terminal respectively coupled to the second input terminal and the output terminal of the operational amplifier.

9. The switched-capacitor tracking apparatus as claimed in claim 2, further comprising:

a second clock phase generator generating a third phase signal and a fourth phase signal phase-inverted from each other, according to a second clock signal;

wherein the control circuit includes a logic operator determining whether to transmit the third phase signal and the fourth phase signal to the fifth switch and the sixth switch, according to the comparison result.

10. The switched-capacitor tracking apparatus as claimed in claim 9, wherein a frequency of the second phase signal is an integer multiple of a frequency of the first phase signal.

11. The switched-capacitor tracking apparatus as claimed in claim 9, wherein the control circuit further comprises:

an integrator having an input terminal coupled to the second terminal of the second switch;

a comparator having a first input terminal coupled to the third reference voltage and a second input terminal coupled to an output terminal of the integrator; and a latch circuit having an input terminal coupled to an output terminal of the comparator, a trigger terminal receiving the first clock signal, and an output terminal providing the comparison result to the logic operator.

12. The switched-capacitor tracking apparatus as claimed in claim 11, wherein the control circuit further comprises:

a counter having an input terminal coupled to the output terminal of the latch circuit, so as to accumulate a plurality of comparison results in the statistics period and to transmit an accumulated result; and a signal processor controlling the variable capacitor according to the accumulated result, wherein if the accumulated result shows all the comparison results in the statistics period are the first logic value, then the signal processor increases the first capacitor step value one step, so as to control the variable capacitor into increasing the capacitance one step, and if the accumulated result shows all the comparison results in the statistics period are the second logic value, then the signal processor decreases the first capacitor step value one step, so as to control the variable capacitor into decreasing the capacitance one step.

13. The switched-capacitor tracking apparatus as claimed in claim 11, wherein the integrator comprises:
    an operational amplifier having a first input terminal coupled to the third reference voltage, a second input terminal coupled to the second terminal of the second switch, and an output terminal used as an output terminal of the integrator; and
    a feedback capacitor having a first terminal and a second terminal respectively coupled to the second input terminal and the output terminal of the operational amplifier.

14. The switched-capacitor tracking apparatus as claimed in claim 1, wherein the panel capacitor is a pixel capacitor of a touch panel.

15. An operating method of a capacitor tracking apparatus, wherein the capacitor tracking apparatus includes the switched-capacitor tracking apparatus as claimed in claim 1, the operating method comprising:
    defining a period of a plurality of clock cycles in the first clock signal as a first statistics period;
    setting the capacitance of the variable capacitor in the first statistics period according to a first capacitor step value;
    turning on the first switch and the third switch and turning off the second switch and the fourth switch in a charge period of the first clock signal;
    turning off the first switch and the third switch and turning on the second switch and the fourth switch in a detection period of the first clock signal;
    comparing the third reference voltage and the voltage at the second terminal of the second switch, so as to obtain a comparison result;
    controlling the fifth switch and the sixth switch according to the comparison result;
    accumulating a plurality of comparison results in the first statistics period;
    increasing the first capacitor step value if all the comparison results in the first statistics period are a first logic value; and
    decreasing the first capacitor step value if all the comparison results in the first statistics period are a second logic value.

16. The operating method as claimed in claim 15, further comprising:
    when the comparison result shows the third reference voltage larger than the voltage at the second terminal of the second switch, turning on the fifth switch and turning off the sixth switch in the charge period of the first clock signal, and turning off the fifth switch and turning on the sixth switch in the detection period of the first clock signal; and
    when the comparison result shows the third reference voltage smaller than the voltage at the second terminal of the second switch, turning off the fifth switch and the sixth switch.

17. The operating method as claimed in claim 15, further comprising:
    providing a second clock signal;
    when the comparison result shows the third reference voltage larger than the voltage at the second terminal of the second switch, turning on the fifth switch and turning off the sixth switch in the charge period of the second clock signal, and turning off the fifth switch and turning on the sixth switch in the detection period of the second clock signal; and
    when the comparison result shows the third reference voltage smaller than the voltage at the second terminal of the second switch, turning off the fifth switch and the sixth switch.

18. The operating method as claimed in claim 17, wherein a frequency of the second clock signal is an integer multiple of a frequency of the first clock signal.

19. The operating method as claimed in claim 15, further comprising:
    defining after the first statistics period ends a period of a plurality of clock cycles in the first clock signal as a second statistics period;
    setting the capacitance of the variable capacitor in the second statistics period according to a second capacitor step value, wherein the first capacitor step value and the second capacitor step value differ by half a step;
    accumulating a plurality of comparison results in the second statistics period;
    increasing the second capacitor step value if all the comparison results in the second statistics period are a first logic value; and
    decreasing the second capacitor step value if all the comparison results in the second statistics period are a second logic value.

20. The operating method as claimed in claim 19, further comprising:
    when a first accumulated value obtained from accumulating the comparison results in the first statistics period, and a second accumulated value obtained from accumulating the comparison results in the second statistics period are both smaller than a middle value,
        decreasing the first capacitor step value if the first capacitor step value is larger than the second capacitor step value; and
        decreasing the second capacitor step value if the first capacitor step value is smaller than the second capacitor step value.

21. The operating method as claimed in claim 19, further comprising:
    when a first accumulated value obtained from accumulating the comparison results in the first statistics period, and a second accumulated value obtained from accumulating the comparison results in the second statistics period are both larger than a middle value,
        increasing the first capacitor step value if the first capacitor step value is smaller than the second capacitor step value; and
        increasing the second capacitor step value if the first capacitor step value is larger than the second capacitor step value.

22. The operating method as claimed in claim 19, further comprising:
    maintaining the first capacitor step value and the second capacitor step value when one of a first accumulated value and a second accumulated value is smaller than a middle value and another one of the first accumulated value and the second accumulated value is larger than the middle value, wherein the first accumulated value is obtained from accumulating the comparison results in the first statistics period, and the second accumulated value is obtained from accumulating the comparison results in the second statistics period.

* * * * *